> US006037390A

United States Patent [19]
Page et al.

[11] Patent Number: 6,037,390
[45] Date of Patent: *Mar. 14, 2000

[54] SMEAR RESISTANT PIGMENTED INK JET INKS CONTAINING β-DIKETONE OR UREIDO DISPERSANTS

[75] Inventors: Loretta Ann Grezzo Page, Newark, Del.; Sheau-Hwa Ma, Chadds Ford, Pa.; John A. Simms, Wilmington, Del.

[73] Assignee: E. I. du Pont de Nemours and Company, Wilmington, Del.

[*] Notice: This patent is subject to a terminal disclaimer.

[21] Appl. No.: 09/002,066

[22] Filed: Dec. 31, 1997

[51] Int. Cl.⁷ .......................... C09D 11/10; C08L 39/04; C08L 61/00; C08K 5/21; C08K 5/3415
[52] U.S. Cl. .................. 523/160; 524/548; 524/558; 524/561
[58] Field of Search ..................... 523/160, 161; 106/31.78, 31.85, 31.86, 31.89; 524/558, 560, 561, 548

[56] References Cited

U.S. PATENT DOCUMENTS

| | | | |
|---|---|---|---|
| 3,300,429 | 1/1967 | Glavis et al. | 524/516 |
| 4,219,454 | 8/1980 | Iacoviello et al. | 524/812 |
| 4,314,067 | 2/1982 | Herman et al. | 548/324.1 |
| 4,421,889 | 12/1983 | Braun et al. | 524/381 |
| 4,654,397 | 3/1987 | Mueller-Mall et al. | 524/460 |
| 5,106,417 | 4/1992 | Houser et al. | 106/20 |
| 5,302,197 | 4/1994 | Wickramanayke et al. | 106/31.76 |
| 5,380,784 | 1/1995 | Usuki et al. | 524/407 |
| 5,500,457 | 3/1996 | Sarkar et al. | 523/201 |
| 5,525,662 | 6/1996 | Lavoie et al. | 524/558 |
| 5,605,953 | 2/1997 | Esser | 524/522 |
| 5,739,196 | 4/1998 | Jenkins et al. | 524/460 |
| 5,852,123 | 12/1998 | Huybrechts | 525/282 |

FOREIGN PATENT DOCUMENTS

WO 97/43351  11/1997  WIPO.

OTHER PUBLICATIONS

Finley, Charles, Printing Paper and Inks, Delmar Publishers, Albany (pp. 76–77), 1997.

Leach, R.H. and Pierce, R.J., The Printing ink Manual, Blueprint, London (p. 83), 1993.

*Primary Examiner*—Vasu Jagannathan
*Assistant Examiner*—Callie E. Shosho
*Attorney, Agent, or Firm*—Joseph A. Tessari

[57] ABSTRACT

An ink jet ink composition is provided which contains an aqueous vehicle; a colorant; and a polymeric dispersant comprising 2 to 50% by weight of monomers selected from β-diketone containing monomers and ureido monomers, as well as a combination of such ink with a media having basic groups such as primary or secondary amines and divalent cations.

9 Claims, No Drawings

SMEAR RESISTANT PIGMENTED INK JET INKS CONTAINING β-DIKETONE OR UREIDO DISPERSANTS

BACKGROUND OF THE INVENTION

This invention relates to aqueous ink jet inks and more particularly, to aqueous ink jet inks containing β-diketone or ureido dispersants to improve smudge and smear resistance of the applied ink.

Ink jet printing is a non-impact printing process in which droplets of ink are deposited on a substrate such as paper or transparency film in response to an electronic signal. Low cost and high quality of the output, combined with relatively noise free operation, have made ink jet printers a popular option to other types of printers used with computers.

Both dyes and pigments have been used as ink colorants for ink jet printers. The dye-based inks while in general superior in color properties have several disadvantages as compared to pigment based inks. The dyes are usually water soluble and remain so after drying on the substrate. They are easily redissolved by water spills, and the image smears on contact with felt pen markers. In addition, the dyes exhibit poor light stability relative to pigments and are known to fade even under office lighting. Thus, dye-based inks are often unsuitable for use in applications requiring moisture resistance and greater light stability. The pigments are preferred colorants provided the pigment dispersion can be made resistant to flocculation and settling.

Water-based pigment dispersions are well known in the art, and have been used commercially for applying films, such as paints, to various substrates. The pigment dispersion is generally stabilized by either a non-ionic or ionic technique. When using the non-ionic technique, the pigment particles are stabilized by a polymer that has a water-soluble, hydrophilic section that extends into the water and provides entropic or steric stabilization. Representative polymers useful for this purpose include polyvinyl alcohol, cellulosics, ethylene oxide modified phenols, and ethylene oxide/propylene oxide polymers. While the non-ionic technique is not sensitive to pH changes or ionic contamination, it has a major disadvantage for many applications in that the final product is water sensitive. Thus, if used in ink applications or the like, the pigment will tend to smear upon exposure to moisture, and mechanical action such as handling. "Highlighting" text with a felt-tip pen which contains translucent ink is particularly damaging to the image, since the solvents in the highlighting ink smear the text, and the mechanical action smudges the print. Also, pigmented ink systems tend to have low chroma versus dye-based ink systems, and are prone to poor pen performance due to ink crusting on the pen orifices, coating of the pen resistors, etc.

There exists a need for ink jet inks which have good water resistance, smear fastness and good pen performance. In particular, with pigment based inks there is a need to maintain the stability of the dispersion while improving water and smear fastness.

SUMMARY OF THE INVENTION

Surprisingly and unexpectedly it was found that inks containing β-diketone polymeric dispersants provided images having improved good water resistance and smear fastness. Accordingly, the present invention provides an inkjet ink comprising:

(a) an aqueous vehicle;
(b) a colorant; and
(c) a polymeric dispersant comprising 2 to 50% by weight of monomers selected from the group consisting of β-diketone monomers having structure (I) and ureido monomers having structure (II):

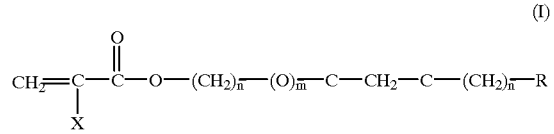

where $X=CH_3$ or H; $n=1-10$; $m=0$ or 1; and $R=H$ or an organic moiety

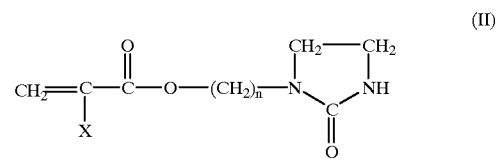

where $X=CH_3$ or H; $n=1-10$.

The inks of the invention are stable, have low viscosity, exhibit excellent print quality, provide excellent smear resistance after drying and good decap or crusting time. They may be used with a variety of ink jet printers such as continuous, piezoelectric, drop-on-demand and thermal or bubble jet drop-on-demand, and are particularly adapted for use in thermal ink jet printers. These inks may also be useful in air brush printing devices. In another embodiment of the invention and ink/media set is provided comprising an ink as set forth above in combination with a media having thereon primary amine groups, secondary amine groups or divalent cations.

DETAILED DESCRIPTION OF THE INVENTION

The invention provides an ink jet ink composition which is particularly suited for use in thermal inkjet printers. The inks comprise an aqueous vehicle, a colorant and a β-diketone or ureido containing polymeric dispersant, preferably a structured polymeric dispersant. These inks are stable over long periods, both in storage and in the printer.

Aqueous Vehicle

The aqueous vehicle is water or a mixture of water and at least one water soluble organic solvent. Selection of a suitable mixture depends on the requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698. A mixture of water and a polyhydric alcohol, such as diethylene glycol, is preferred as the aqueous vehicle in which case the aqueous vehicle usually contains from about 30% to about 95% water with the balance (i.e., 70 to 5%) being the water-soluble solvent. Preferably, the aqueous vehicle is 60–95%, by weight, water. The aqueous vehicle comprises 70 to 99.8%, by weight of the total ink composition, depending on the type of colorant selected. Preferably, the aqueous vehicle comprises 94–99.8% when an organic pigment is selected; 70 to 99.8% when an inorganic pigment is selected; and 80 to 99.8% when a dispersed dye is selected.

Colorants

The colorant is either a disperse dye or a pigment that is insoluble in the aqueous vehicle. By "pigment" we mean a colorant that is insoluble (i.e., in particulate or crystalline form) throughout the printing process. "Dispersed dyes" are colorants that, while insoluble in the aqueous vehicle, become soluble at some point in the printing process. Pigments are the preferred colorants for use in the ink compositions of this invention.

Pigments

Useful pigments comprise a wide variety of organic and inorganic pigments, alone or in combination. The pigment particles are sufficiently small to permit free flow of the ink through the ink jet printing device, especially at the ejecting nozzles that usually have a diameter ranging from 10 microns to 50 microns. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 microns, preferably 0.005 to 5 microns, and most preferably from 0.01 to 0.3 micron. Representative commercial dry and presscake pigments that may be used in practicing the invention are disclosed in U.S. Pat. No. 5,085,698.

In the case of organic pigments, the ink may contain up to approximately 30% pigment by weight, but will generally be in the range of approximately 1 to 15%, preferably approximately 1 to 8%, by weight of the total ink composition for most ink jet printing applications. If an inorganic pigment is selected, the ink will tend to contain higher weight percentages of the pigment than with comparable inks employing organic pigment, and may be as high as approximately 50%, because inorganic pigments generally have a higher specific gravity.

Disperse Dyes

The color and amount of dye present in the ink composition is largely a function of choice, being primarily dependent upon the desired color of the print achieved with the ink, the purity of the dye and its strength. Low concentrations of dye may not give adequate color vividness whereas high concentrations may result in poor printhead performance or unacceptably dark colors. Generally, the disperse dye will be present in the amount of 0.01 to 20%, preferably 0.05 to 8%, and most preferably 1 to 5%, by weight, based on the total weight of the ink composition. Disperse dyes that may be useful in this invention are known to those in the art and are disclosed in U.S. Pat. Nos. 5,053,495; 5,203,912; and 5,102,448; all of which are incorporated herein by reference.

Polymeric Dispersant

Polymeric dispersants suitable for practicing the invention include random polymers and structured polymeric dispersants such as block copolymers and branched or graft-type polymers. The polymers may be anionic, cationic, or non-ionic in nature.

The β-diketone or ureido containing polymeric dispersants comprise 2–50% by weight of β-diketone monomers having structure (I) or a ureido containing monomer of structure (II)

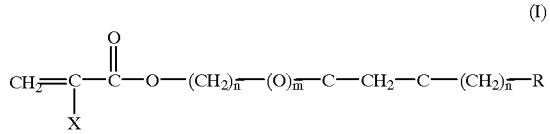

(I)

wherein X=CH₃ or H; n=1–10; m=0 or 1; and R=H or an organic moiety

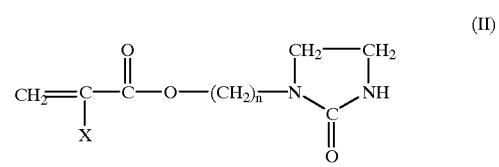

(II)

where X=CH₃ or H; n=1–10.

Some suitable β-diketone or ureido-containing polymeric dispersants include acetoacetoxy ethyl methacrylate, 2-(acetoacetoxy)ethyl acrylate, methacrylamidoethylacetoxy acetate, hexadione methacrylate, 2-(acetoacetoxy) propyl methacrylate, N-(2-methacryloyloxyethyl)ethylene urea, methacrylamidoethylethylene urea, etc.

Additional monomers that may be used in the preparation of the dispersant are hydrophobic and hydrophilic monomers. Some examples of hydrophobic monomers used in polymeric dispersants are methyl methacrylate, n-butyl methacrylate, 2-ethylhexyl methacrylate, benzyl methacrylate, 2-phenylethyl methacrylate and the corresponding acrylates, styrene, butadiene, and the like. Some examples of hydrophilic monomers are methacrylic acid, acrylic acid, diemthylamionethyl [meth]acrylate, 2-aminomethylpropane sulfonic acid, styrene sulfonic acid, styrene sulfonate, sulfopropyl acrylate, and vinyl phosphonic acid.

The amount of the polymer dispersant present in the ink composition depends on the structure, molecular weight and other properties of the polymer, and on the other components of the ink composition. The polymeric dispersants that are selected in practicing the invention have number average molecular weight of below 40,000, preferably below 20,000, and typically in the range of 2,000 to 10,000. Typically, the polymeric dispersant is present in the amount of 0.1 to 25%, preferably 0.1 to 8% by weight, based on the total weight of the ink composition. If the amount is too high, it will be difficult to maintain the desired ink viscosity. Dispersion stability will be adversely affected if insufficient polymer is present.

Other Ingredients

The ink may contain other ingredients that are commonly used in the art. For example, surfactants may be used to alter surface tension as well as maximize penetration of the ink into the print media. However, surfactants may destabilize the dispersion, so care must be taken in selecting the appropriate surfactant. In addition, the choice of a specific surfactant is highly dependent on the type of media substrate to be printed. In aqueous inks, the surfactants may be present in the amount of 0.01 to 5% and preferably 0.2 to 2%, based on the total weight of the ink.

Biocides, such as Dowicides® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), Troysans® (Troy Chemical Corp., Newark, N.J.) and sodium benzoate may be used in the ink compositions to inhibit growth of microorganisms. Sequestering agents such as EDTA may also be included to eliminate deleterious effects of heavy metal impurities. Other known additives, such as humectants, viscosity modifiers and the like made also be added to improve various properties of the ink compositions.

Ink Preparation and Properties

The inks are prepared by premixing the selected colorant (s) and dispersant and then dispersing or deflocculating the mixture. The dispersing step may be accomplished in a horizontal mini mill, a ball mill, an attritor, a roll mill such as a 2 roll or 3 roll mill, or by passing the mixture through a plurality of nozzles within a liquid jet interaction chamber at a liquid pressure of at least 5000 psi to produce a uniform dispersion in the aqueous vehicle. It is generally desirable to make these inkjet inks in concentrated form. The concentrated ink jet inks are subsequently diluted to the appropriate concentration for use in the ink jet printing system. This technique permits preparation of a greater quantity of ink from the equipment. Prior to use, the concentrate is then diluted to the desired concentration with appropriate solvents which contain the water soluble binder additive. By dilution, the ink is adjusted to the desired viscosity, color, hue, saturation density, and print area coverage for the particular application.

Jet velocity, separation length of the droplets, drop size, and stream stability are greatly affected by the surface tension and the viscosity of the ink. Inkjet inks suitable for use with ink jet printing systems should have a surface tension in the range of about 20 dyne/cm to about 70 dyne/cm and, more preferably, in the range 30 dyne/cm to about 70 dyne/cm. Acceptable viscosity is no greater than 20 cP, and preferably in the range of about 1.0 cP to about 10.0 cP. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, and are particularly adapted for use in thermal ink jet printers. The inks have excellent storage stability for a long period and do not clog in an ink jet apparatus. Fixing the ink on the image recording material, such as, paper, fabric, film, etc., can be carried out rapidly and accurately. The printed ink images have clear color tones, high density, excellent water resistance and lightfastness. Furthermore, the ink does not corrode parts of the inkjet printing device it comes in contact with.

MEDIA

The media (i.e., the ink jet recording sheet) that is particularly useful with these inks has thereon primary amine groups, secondary amine groups or metal cations. These groups may be part of the recording sheet itself or preferably may be present in a coating on the substrate or recording sheet. Some useful substrates include papers such as Gilbert® bond paper (Mead Corporation, Menasha, Wis.), Champion DataCopy® (Champion International Corp., Stamford, Conn.), Hammermill Fore® DP (Hammermill Papers, Erie, Pa.), Weyerhaeuser First Choice® (Weyerhaeuser Co., Takoma Wash.), transparent films such as polyester, polyethylene, polypropylene, polyamides, etc.; and fabrics or textiles made of cotton, wool, NYLON®, etc. Some useful coatings on the media are selected from the group consisting of aminomethyl propanol, aminoethyl propanol, diethylaminoethanol, diethanol amine, amino ended polyethylene oxide, amino ended polyethylene oxide and mixtures thereof. Particularly preferred as these coatings are the Jeffamine® brand of polyoxyalkylamines which are commercially available from Texaco Chemical Co. Athens, N.Y. Most preferred are Jeffamine® T403, T3000, T5000, M-600, M-715, M-1000, M-2005, M-2070, D-230, D-400, D-2000, D-4000, ED-600, ED-900, ED-2001, ED-4000, 6000, EDR-148, EDR-192, and C-346.

EXAMPLES

The invention will now be further illustrated by, but not limited to, the following examples, in which parts and percentages are by weight unless otherwise noted.

Glossary

ETEGMA Ethoxytriethyleneglycol methacrylate

MAA Methacrylic acid

AAEM Acetoacetoxy ethyl methacrylate

Co(DPG-BF2) Diaquabis-(borondifluorodiphenyl-glyoximato)

THF Tetrahydrofuran

BA Butyl acrylate

MA Methyl acrylate

HEUMA N-(2-methacryloyloxyethyl)ethylene urea

BZMA Benzyl methacrylate

TBACB Tetrabutyl ammonium m-chlorobenzoate

MEK Methyl ethyl ketone

Polymer 1: ETEGMA/MAA/AAEM (40/40/20) macromonomer

To a 1-liter flask equipped with a mechanical stirrer, thermometer, N2 inlet, and addition funnels was charged 25 g MAA, 25 g ETEGMA, 15 g AAEM and 180 g THF. The reaction mixture was heated to reflux, and 0.045 g Diaquabis-(borondifluorodiphenyl-glyoximato) cobalt(II), and 0.26 g VAZO® 52, (DuPont, Wilmington, Del.), dissolved in 40 g THF was added to the pot. The reaction mixture was reheated to the reflux temperature (75° C.) and 75 g MAA, 75 g ETEGMA, and 35 g AAEM were added over 240 min. Concurrently, 0.04 g Co(DPG-BF2) and 1.6 g of VAZO® 52 dissolved in 40 g of THF were fed over 90 min, followed by an additional 1.6 g of VAZO® 52 and 0.04 g Co(DPG-BF2) dissolved in 40 g of THF fed in over 180 min. Reflux was maintained for an additional 30 minutes. The reaction mixture had nominal 39.2% solids.

Polymer 2: BA/MA//-g-ETEGMA/MAA/AAEM (35/35//-g-12/12/6)

To a 500 ml flask equipped with a mechanical stirrer, thermometer, N2 inlet, and addition funnels, was charged 76.7 g of the above macromonomer solution, 5 g BA, 5 g MA, and 70 g isopropanol. The solution was heated to reflux (80° C.). A solution of 0.5 g Lupersol® 11 dissolved in 5 g isopropanol was added in one shot. Then a mixture of (1) 30 g MA and 30 g BA and (2) 0.5 g Lupersol® 11 dissolved in 5 g isopropanol was fed in over 30 min. After addition was complete, an additional 0.5 g Lupersol® 11 dissolved in 5 g isopropanol was added in one shot. The reaction mixture was kept at the reflux temperature for an additional 60 minutes. The resulting polymer solution was 43.4% solids, acid number 2.08 meq/g solids. The graft polymer was neutralized by mixing 100.0 g of the polymer solution with 8.3 g of potassium hydroxide solution (45.4% in deionized water) and 181.3 g deionized water. The resulting solution was 15% polymer solids.

Polymer 3: BZMA//MAA (13//10)

A 1-liter flask was equipped with a mechanical stirrer, thermocouple, N2 inlet, drying tube outlet, and addition funnels. THF, 170.0 g, was charged to the flask. The catalyst, tetrabutyl ammonium m-chlorobenzoate (TBACB), 0.43 ml of a 1.0 M solution in acetonitrile, was then added. Initiator, 1,1-bis(trimethylsiloxy)-2-methyl propene, 10.0 g (43.1 mmol) was injected. Feed 1 (TBACB, 0.46 ml of a 1 M solution in acetonitrile) was started and added over 220 minutes. Feed II ((trimethylsiloxy)methacrylic acid, 68.1 g (0.431 mol)) was added over 30 min. One hour after Feed II was completed and over 95% of the monomer had reacted, Feed III (BZMA, 98.62 g (0.560 mol)) was added over 30 min. After the reaction was completed, the reaction was quenched with 21.0 g of methanol. Final solids were 38%.

Polymer 4: ETEGMA//BZMA//MAA (4//15/12)

A 2-liter flask was equipped with a mechanical stirrer, thermocouple, N2 inlet, drying tube outlet, and addition funnels. Tetrahydrofuran, THF, 830 g, was charged to the flask. The catalyst, tetrabutyl ammonium m-chlorobenzoate, 2.3 ml of a 1.0 M solution in acetonitrile, was then added. Initiator, 1,1-bis(trimethylsiloxy)-2-methyl-1-propene, 50.0 g (0.216 moles) was injected. Feed I [trimethylsilylmethacrylate, 408.62 g (2.57 moles)] was started at 0.0 minutes and added over 30 minutes. One hundred minutes after Feed I was completed (over 99% of the monomer had reacted), Feed II [benzyl methacrylate BZMA, 568.97 g (3.23 moles)] was started and added over 30 minutes. Thirty minutes after Feed II was completed (over 99% of the monomers had reacted), Feed III [2-(ethoxytriethyleneglycol) methacrylate ETEGMA 212.07 g (0.862 moles)] was started and added over 10 minutes. After stirring 10 hours, 124 g of dry methanol were added to the above solution and distillation begun, 2-pyrrolidone replacing the solvents. This made a ETEGMA//BZMA//MAA triblock polymer. The block polymer was neutralized by mixing 791.1 g of the polymer solution with 99.3 g of potassium hydroxide solution (45.9% in deionized water) and 2608.8 g of deionized water until a homogeneous 10% polymer solution was obtained.

Polymer 5: BZMA/ETEGMA (80/20 macromonomer)

To a 5-liter flask equipped with a mechanical stirrer, thermometer, N2 inlet, and addition funnels was charged 360 g BZMA, 90 g ETEGMA, and 1260 g MEK. The reaction mixture was heated to reflux, and 0.075 g diaquabis-(boron difluorodiphenylglyoximato) cobalt(II) in 49.9 g MEK, and 4.5 g VAZO® 52 dissolved in 22.5 g MEK was added to the pot. The addition flasks were rinsed with 30 g MEK. The reaction mixture was reheated to the reflux temperature (84° C.) and 840 g BZMA and 210 g ETEGMA were added over 240 min. Concurrently 22.5 g of VAZO® 52 dissolved in 112.5 g of MEK were fed over 240 min, followed by an additional 4.5 g of VAZO® 52 dissolved in 22.5 g of MEK added in one shot. Reflux was maintained for an additional 60 minutes. The reaction mixture had nominal 50% solids.

Polymer 6: HEUMA/MMA/AA/MA//-g-BZMA/ETEGMA (5/20/20/30//-g-25/6)

A 1-liter flask was equipped with a mechanical stirrer, thermocouple, N2 inlet, drying tube outlet, and addition funnels. A monomer solution consisting of 60 g acrylic acid, 75 g methyl acrylate, and 75 g Rohamere® 6844-0 (Rohm Tech, Inc. Darmstadt, Germany) were mixed together and place in an addition funnel (Charge I). An initiator solution of 2.25 g Lupersol® 11 dissolved in 9 g MEK was placed in another addition funnel (Charge). BZMA/ETEGMA macromonomer (Polymer Preparation 5) 180 g, was charged to the pot along with 105 g MEK and 21 g of the monomer solution (Charge I). The mixture was heated to reflux and then the initiator solution (Charge II) was added to the pot. Over 240 minutes, the remainder of Charge I was added to the pot. Simultaneously, 90% of a solution of 6 g VAZO® 52 in 24 g MEK (Charge III) was added to the pot over 240 minutes. After these additions were complete, the remainder of Charge III was added to the pot and refluxed for an additional 60 minutes. The final polymer was 57.4% solids. The polymer was neutralized to 90% with KOH and diluted to 10% solids.

Dispersion 1

A black pigment dispersion was prepared using the following procedure:

| Ingredient | Amount (grams) |
| --- | --- |
| FW18, Carbon black pigment (Degussa Corp., Allendale, NJ) | 60.0 |
| Polymer 4 (10% solution) | 300.0 |
| Deionized water | 240.0 |

The above mentioned components were premixed in a plastic beaker by mechanical stirring until no lumps or dry clumps were visible. The mixture was dispersed in a microfluidizer (Microfluidics Corp., Waltham, Mass.) under a liquid pressure of about 8,000 psi. The resulting pigment dispersion had a 10% pigment concentration. The dispersion was filtered through a 1 micron high efficiency filter bed (3M Filtration Products, St. Paul, Minn.).

Dispersion 2

A black pigment dispersion was made as described in Dispersion 1, except the following ingredients were used:

| Ingredient | Amount (grams) |
| --- | --- |
| FW18 | 28.13 |
| Polymer 2 (15% solution) | 125.00 |
| Deionized water | 128.00 |

Dispersion 3

A cyan pigment dispersion was made as described in Dispersion 1, except the following ingredients were used:

| Ingredient | Amount (grams) |
| --- | --- |
| Endurophthal ® BT-617D, Cookson Pigments Newark, NJ) | 25.0 |
| Polymer 6 (10% solution) | 166.7 |
| Deionized water | 75.0 |

Dispersion 4

A cyan pigment dispersion was made as described below:

| Ingredient | Amount (grams) |
| --- | --- |
| Endurophthal ® BT-617D | 225.0 |
| Polymer 3 (38% solids) | 394.7 |
| Diethylene glycol | 30.0 |

This mixture was charged to a 2 roll mill and processed for 30 minutes at 65° C. This makes a pigment dispersion that contains 60% pigment and 40% polymer. 28.6 g of the 2 roll mill chip was dissolved in 2.9 g dimnethylaminoethanol and 70.3 g of deionized water with stirring to make an aqueous pigment dispersion concentrate that contains 15% pigment and had 90 mole % of the acid groups from the polymer neutralized with dimethylaminoethanol.

Control 1

An black ink containing 3.75% pigment and 1.875% polymer dispersant was prepared by stirring together 35 g of Dispersion 1 with appropriate quantities of Liponics® EG-1 (Lipo Chemicals, Inc., Patterson, N.J.), 2-pyrrolidone, and Nuosept® 95 (Huls America, Inc., Piscataway, N.J.), and deionized water to make an ink with final concentrations of 8% Liponics® EG-1, 10% 2-pyrrolidone, and 0.3% Nuosept® 95.

The ink was printed onto PWA paper in 5 parallel, vertical lines, 7/16 in. apart using a Hewlett-Packard 1200C printer (Hewlett-Packard Co., Palo Alto, Calif.) with the heater turned off. The optical density of the image was measured to be 1.34 O.D. units. One minute after printing the lines were swiped over horizontally with a yellow Sanford® Major Accent Highlighting Marker two times. Black optical density of the originally white area between lines was measured as an indication of the amount of smear. After highlighting the black smear measured 0.333 O.D. units.

Control 2

The black ink from Control 1 was printed in the same manner as described in Control 1 with the following exception: before printing, the PWA paper was treated with a 10% solution of Jeffamine® T403 (Texaco Corp.) dissolved in water and was allowed to dry. Optical density of the black image was 1.33 O.D. units. After highlighting the black smear was 0.378 O.D. units.

Control 3

A cyan ink containing 3% pigment and 2% polymer dispersant was prepared by stirring together 40 g of Dispersion 4 with appropriate quantities of Liponics® EG-1, N-methyl pyrrolidone, emulsion thickeners, surfactants and deionized water to make an ink with final concentrations of 2.5% Liponics® EG-1, and 5% N-methyl pyrrolidone.

The ink was air sprayed onto DuPont copy paper. One minute after printing the lines were swiped over horizontally with a yellow Sanford® Major Accent Highlighting Marker two times. Cyan optical density of the originally white area adjacent to the lines was measured as an indication of the amount of smear. After highlighting the cyan smear measured 0.059 O.D. units.

EXAMPLE 1

A black ink was made as in Control 1 with the following exceptions: the ink contained 3.5% pigment and 2.33% polymer dispersant was prepared using Dispersion 2 instead of Dispersion 1. The cosolvents for the ink were 5.7% diethylene glycol, 5.7% Liponics® EG-1, and 0.9% N-methyl pyrrolidone.

The ink was printed and highlighted as described in Control 1. Image density was 1.43 O.D. units. After highlighting, smear was 0.115 O.D. units.

EXAMPLE 2

Control 2 was repeated using the same ink from Example 1. Optical density of the black image was 1.29 O.D. units. After highlighting, smear was measured at 0.068 O.D. units.

EXAMPLE 3

A cyan ink containing 3% pigment and 2% polymer dispersant was prepared by stirring together 40 g of Dispersion 3 with appropriate quantities of 2-pyrrolidone and deionized water to make an ink with final concentrations of 10% N-methyl pyrrolidone.

The ink was air sprayed onto DuPont copy paper. One minute after printing the lines were swiped over horizontally with a yellow Sanford® Major Accent Highlighting Marker two times. Cyan optical density of the originally white area adjacent to the lines was measured as an indication of the amount of smear. Image density was 1.38 O.D. units. After highlighting the cyan smear measured 0.024 O.D. units.

What is claimed is:

1. An ink jet ink composition comprising:

(a) 70–98% by weight, based on the total weight of the ink, of an aqueous vehicle;

(b) a colorant; and (c) 0.1 to 8% by weight, based on the total weight of the ink, of a polymeric dispersant comprising 2 to 50% by weight of monomers selected from the group consisting of β-diketone monomers having structure (I) and ureido monomers of structure (II):

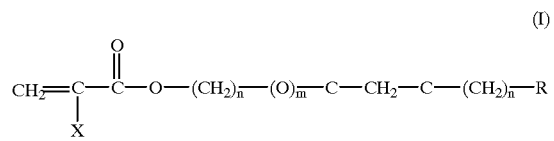

wherein $X=CH_3$ or H; $n=1-10$; $m=0$ or 1; and $R=H$ or an organic moiety

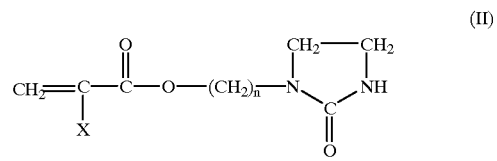

where $X=CH_3$ or H; $n=1-10$ (d) wherein said ink composition is formulated to be jettable from an ink jet printer and has a surface tension of 20 to 70 dyne/cm and a viscosity of 1 cP to 10 cP at 20° C.

2. The ink of claim 1 wherein the polymeric dispersant comprises 5 to 25% by weight of said monomers.

3. The ink of claim 1 wherein the polymeric dispersant is selected from the group consisting of acetoacetoxy ethyl methacrylate, 2-(acetoacetoxy)ethyl acrylate, methacrylamidoethylacetoxy acetate, hexadione methacrylate, 2-(acetoacetoxy) propyl methacrylate, N-(2-methacryloyloxyethyl)-ethylene urea and methacrylamidoethylethylene urea.

4. The ink of claim 1 wherein the polymeric dispersant is present in the amount of 0.1 to 25% by weight, based on the total weight of the ink composition.

5. The ink of claim 1 wherein the polymeric dispersant is present in the amount of 0.1 to 8% by weight, based on the total weight of the ink composition.

6. The ink of claim 1 wherein the polymeric dispersant is a structured polymer.

7. An ink jet ink and media comprising, in combination:

(a) an ink jet ink comprising:

(1) 70–98% by weight, based on the total weight of the ink, of an aqueous vehicle;

(2) a colorant; and (3) a polymeric dispersant comprising 2 to 50% by weight of monomers selected from the group consisting of β-diketone monomers having structure (I) and ureido monomers of structure (II):

(I)

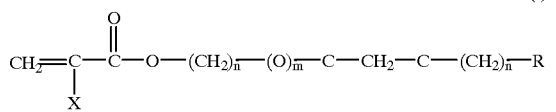

wherein $X=CH_3$ or H; n=1–10; m=0 or 1; and R=H or an organic moiety (II)

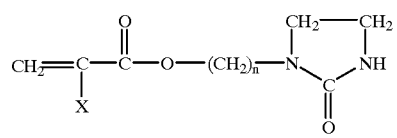

where $X=CH_3$ or H; n=1–10 wherein said ink composition is formulated to be jettable from an ink jet printer and has a surface tension of 20 to 70 dyne/cm and a viscosity of 1 cP to 10 cP at 20° C.; and (b) a media having thereon basic groups selected from primary amine groups, secondary amine groups and divalent cations.

8. The combination of claim 7 wherein the media further comprises a substrate having a coating thereon, wherein said coating contains said basic groups.

9. The combination of claim 8 wherein the coating is selected from the group consisting of aminomethyl propanol, aminoethyl propanol, diethylamino-ethanol, diethanol amine, amino ended polyethylene oxide, amino ended polypropylene oxide and mixtures thereof.

* * * * *

UNITED STATES PATENT AND TRADEMARK OFFICE
CERTIFICATE OF CORRECTION

PATENT NO. : 6,037,390
DATED : March 14, 2000
INVENTOR(S) : Page et al.

It is certified that error appears in the above-identified patent and that said Letters Patent is hereby corrected as shown below:

Column 10, claim 1,
Line 17, delete

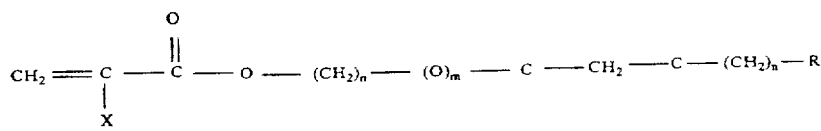

and substitute therefor

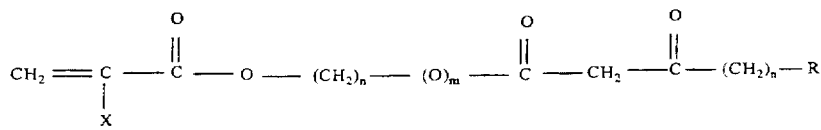

Signed and Sealed this

Nineteenth Day of March, 2002

Attest:

JAMES E. ROGAN
*Director of the United States Patent and Trademark Office*

*Attesting Officer*